US006662359B1

(12) United States Patent
Berry et al.

(10) Patent No.: US 6,662,359 B1
(45) Date of Patent: *Dec. 9, 2003

(54) SYSTEM AND METHOD FOR INJECTING HOOKS INTO JAVA CLASSES TO HANDLE EXCEPTION AND FINALIZATION PROCESSING

(75) Inventors: Robert Francis Berry, Austin, TX (US); John Day Howard, Austin, TX (US); Riaz Y. Hussain, Austin, TX (US); Frank Eliot Levine, Austin, TX (US); Robert John Urquhart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 551 days.

This patent is subject to a terminal disclaimer.

(21) Appl. No.: 09/620,725

(22) Filed: Jul. 20, 2000

(51) Int. Cl.[7] .................................................. G06F 9/44
(52) U.S. Cl. ........................ 717/130; 717/127; 717/128; 717/131; 717/152; 717/154; 717/158
(58) Field of Search ................................ 717/124, 148, 717/130, 732, 133, 126–128, 131

(56) References Cited

U.S. PATENT DOCUMENTS

| 4,746,920 A | 5/1988 | Nellen et al. ................ 340/825 |
| 4,821,220 A | 4/1989 | Duisberg ..................... 364/578 |

(List continued on next page.)

FOREIGN PATENT DOCUMENTS

| DE | 296 00 609 U1 | 3/1997 | ........... G05B/19/05 |
| WO | WO 94/14117 | 6/1994 | ........... G06F/11/00 |
| WO | WO 96/12224 | 4/1996 | ........... G06F/9/445 |

OTHER PUBLICATIONS

Pavlopoulou, Christina and Young, Michal, "Residual Test Coverage Monitoring", p. 277–284, 1999 ICSE, Los Angeles, CA retrieved from ACM Portal database Mar. 17, 2003.*
Sinha, Saurabh and Harrold, Mary Jean, "Analysis of Programs with Exception–Handling Constructs", p. 1–10, IEEE 1998, retrieved from IEEE database Mar. 17, 2003.*
Sinha, Saurabh and Harrold, Mary Jean, "Criteria for Testing Exception–Handling Constructs in Java Programs", p. 1–36, 1999, retrieved from Google.com, Mar. 17, 2003.*
A Unifying Approach to Performance Analysis in The Java Environment; Alexander et al; vol. 39, No. 1; pp 1–16 Nov. 1, 2000.
Java Virtual Machine Profiler Interface; Viswanathan et al.; vol. 39, No. 1; pp. 1–14 Nov. 1, 2000.
Call Path Profiling of Monotonic Program Resources in UNIX; Hall et al; Jun. 24–25, 1993; pp. 1–13.
Exploiting Hardware Performance Counters with Flow and Context Sensitive Profiling; Ammons et al; 1997; pp. 85–96.
Optimally Profiling and Tracing Programs; Ball et al; Jul. 1994; pp 1319–1360.

(List continued on next page.)

*Primary Examiner*—Tuan Q. Dam
*Assistant Examiner*—Mary Steelman
(74) *Attorney, Agent, or Firm*—Duke W. Yee; Leslie A. Van Leeuwen; Wayne P. Bailey

(57) ABSTRACT

The present invention is directed to a system, method and instructions for handling path flow exception and finalization processing in an object oriented programming language. Initially, each instrumentation method is checked for a code to indicated an exception being thrown. A hook is inserted before the exception code and identifies the method throwing the exception. Methods must also be checked for exception tables. When an exception table is found, then a hook is inserted at the entry point of each exception handler for every entry in the exception table. This hook identifies the method which catches the exception.

16 Claims, 6 Drawing Sheets

U.S. PATENT DOCUMENTS

| | | | |
|---|---|---|---|
| 5,047,919 A | 9/1991 | Sterling et al. | 364/200 |
| 5,161,226 A | 11/1992 | Wainer | 395/650 |
| 5,179,702 A | 1/1993 | Spix et al. | 395/650 |
| 5,307,499 A | 4/1994 | Yin | 395/700 |
| 5,355,487 A | 10/1994 | Keller et al. | 395/650 |
| 5,371,878 A | 12/1994 | Coker | 395/500 |
| 5,442,758 A | 8/1995 | Slingwine et al. | 395/375 |
| 5,450,586 A | 9/1995 | Kuzara et al. | 395/700 |
| 5,459,868 A | 10/1995 | Fong | 395/700 |
| 5,483,654 A | 1/1996 | Staron et al. | 395/650 |
| 5,485,574 A | 1/1996 | Bolosky et al. | 395/183.11 |
| 5,509,070 A | 4/1996 | Schull | 380/4 |
| 5,613,118 A | 3/1997 | Heisch et al. | 395/709 |
| 5,682,328 A | 10/1997 | Roeber et al. | 364/550 |
| 5,706,515 A | 1/1998 | Connelly et al. | 395/676 |
| 5,742,672 A | 4/1998 | Burk | 379/198 |
| 5,758,061 A * | 5/1998 | Plum | 714/35 |
| 5,761,380 A | 6/1998 | Lewis et al. | 395/12 |
| 5,768,500 A | 6/1998 | Agrawal et al. | 395/184.01 |
| 5,799,143 A | 8/1998 | Butt et al. | 395/183.14 |
| 5,845,077 A | 12/1998 | Fawcett | 395/200.51 |
| 5,872,909 A | 2/1999 | Wilner et al. | 395/183.14 |
| 5,884,080 A | 3/1999 | Blandy et al. | 395/704 |
| 5,884,082 A | 3/1999 | Seidel et al. | 395/704 |
| 5,908,470 A | 6/1999 | Stonecypher, Jr. | 713/502 |
| 5,919,247 A | 7/1999 | Van Hoff et al. | 709/217 |
| 5,964,846 A | 10/1999 | Berry et al. | 709/400 |
| 5,966,540 A | 10/1999 | Lister et al. | 395/712 |
| 5,978,578 A | 11/1999 | Azarya et al. | 395/701 |
| 5,991,543 A | 11/1999 | Amberg et al. | 395/712 |
| 5,995,757 A | 11/1999 | Amberg et al. | 395/712 |
| 6,006,035 A | 12/1999 | Nabahi | 395/712 |
| 6,026,237 A * | 2/2000 | Berry et al. | 717/130 |
| 6,151,701 A * | 11/2000 | Humphreys et al. | 717/130 |
| 6,186,677 B1 * | 2/2001 | Angel et al. | 717/118 |
| 6,314,558 B1 * | 11/2001 | Angel et al. | 717/118 |
| 6,481,008 B1 * | 11/2002 | Chaiken et al. | 717/158 |

OTHER PUBLICATIONS

Data Structure and Insertion Algorithm for Representing Asynchronous Occurrences for Visualization by Trace Visualization Tools using Ghant Charts with Occurrence Hierarchies; International Business Machines Technical Disclosure Bulletin; vol 36, No. 07, Jul. 1993; pp. 547–557.

Adaptive Trace–Directed Program Restructuring; International Business Machines Technical Disclosure Bulletin; vol 37 No 02B, Feb. 1994; pp. 115–116.

Profiling and Tracing Dynamic Library Usage Via Interposition; Curry; USENIX Conference; 1994; pp. 267–278.

Application of Interpreter for Debugging Functions; International Business Machines Technical Disclosure Bulletin; vol 36, No 09B, Sep. 1993; pp 67–68.

Minimizing Locking to Access Global Shared Data; International Business Machines Technical Disclosure Bulletin; Feb. 1995; pp. 619–622.

* cited by examiner

SYSTEM AND METHOD FOR INJECTING HOOKS INTO JAVA CLASSES TO HANDLE EXCEPTION AND FINALIZATION PROCESSING

CROSS REFERENCE TO RELATED APPLICATION

The present application is related to copending U.S. patent application Ser. No. 09/620,729 entitled "SYSTEM AND METHOD FOR INSTRUMENTING APPLICATION CLASS FILES WITH CORRELATION INFORMATION TO THE INSTRUMENTATION" filed even date herewith and to U.S. patent application Ser. No. 08/963,080, now U.S. Pat. No. 6,026,237 entitled "SYSTEM AND METHOD FOR DYNAMIC MODIFICATION OF CLASS FILES" filed Nov. 3, 1997. The contents of the above mentioned commonly assigned, co-pending U.S. Patent application and U.S. Patent are hereby incorporated herein by reference for all purposes.

BACKGROUND OF THE INVENTION

1. Technical Field

The present invention relates generally to data processing systems, and in particular, to methods handling path flow exception and finalization processing in an object oriented programming language.

2. Description of Related Art

In languages like C or C++, most errors, such as accessing an array element beyond the end of an array, are undetected. Those errors that are detected, such as an attempt to divide a number by zero, usually cause the program to print out a brief error message and terminate immediately.

A Java system's error handling is more sophisticated. When an error occurs in a method while a program is running, an exception is generated. The method then deals with the exception in one of two ways: with an exception handler or by throwing the exception. An exception handler is a section of the program that checks for a particular type of exception and then executes if the exception occurs. Throwing an exception refers the exception back to the method that called it. If an exception is thrown to the calling method, then this method can in turn either handle the exception in its own exception handler, or throw the exception to its caller. This process continues until either some section of the program handles the exception, or the exception gets thrown to the system. For example, the exception would be thrown to the system when the main method throws an exception. If the system is thrown an exception, it handles it by printing an error message and terminating the program that caused the exception.

An important part of understanding path flow is by instrumenting calls to individual routines. However, in object oriented programming languages such as Java, the flow of control can also include exception and finalization processing. Without including exception processing, during postprocessing exit events may be found that do not have matching entry events, thus the post processing results are subject to incorrect results.

It would be advantageous to provide instrumentation support for exceptions.

SUMMARY OF THE INVENTION

The present invention is directed to a system, method and instructions for handling path flow exception and finalization processing in an object oriented programming language. Initially, each instrumented method is checked for a code to indicate an exception being thrown. A hook is inserted before the exception code and identifies the method throwing the exception. Methods must also be checked for exception tables. When an exception table is found, then a hook is inserted at the entry point of each exception handler for every entry in the exception table. This hook identifies the method which catches the exception or handles finalization processing.

BRIEF DESCRIPTION OF THE DRAWINGS

The foregoing and other features and advantages of the present invention will become more apparent from the detailed description of the best mode for carrying out the invention as rendered below. In the description to follow, reference will be made to the accompanying drawings, where like reference numerals are used to identify like parts in the various views and in which.

DETAILED DESCRIPTION OF A PREFERRED EMBODIMENT OF THE INVENTION

The invention may be implemented on a variety of hardware platforms, including personal computers, workstations, embedded systems, mini-computers, and mainframe computers. Many of the steps of the method according to the present invention may be advantageously implemented on parallel processors of various types.

Figure 1A:
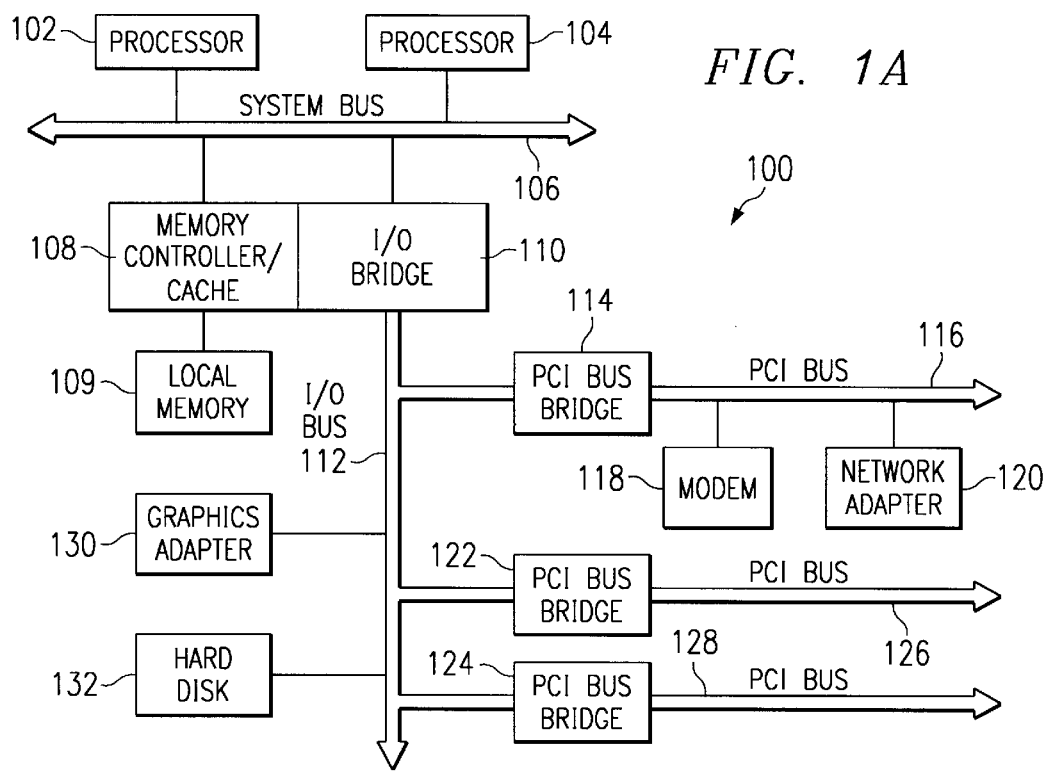
FIG. 1A is a block diagram of a data processing system which may be implemented as a server is depicted in accordance to the present invention.

With reference now to FIG. 1A, a block diagram of a data processing system which may be implemented as a server is depicted in which the present invention may be implemented. Data processing system 100 may be a symmetric multiprocessor (SMP) system including a plurality of processors 102 and 104 connected to system bus 106. Alternatively, a single processor system may be employed. Also connected to system bus 106 is memory controller/cache 108, which provides an interface to local memory 109. I/O Bus Bridge 110 is connected to system bus 106 and provides an interface to I/O bus 112. Memory controller/cache 108 and I/O Bus Bridge 110 may be integrated as depicted.

Peripheral component interconnect (PCI) bus bridge 114 connected to I/O bus 112 provides an interface to PCI local bus 116. A modem 118 may be connected to PCI local bus 116. Typical PCI bus implementations will support four PCI expansion slots or add-in connectors. Communications links to network computers may be provided through modem 118 and network adapter 120 connected to PCI local bus 116 through add-in boards.

Additional PCI bus bridges 122 and 124 provide interfaces for additional PCI buses 126 and 128, from which additional modems or network adapters may be supported. In this manner, server 100 allows connections to multiple network computers. A memory mapped graphics adapter 130 and hard disk 132 may also be connected to I/O bus 112 as depicted, either directly or indirectly.

Those of ordinary skill in the art will appreciate that the hardware depicted in FIG. 1A may vary. For example, other peripheral devices, such as optical disk drive and the like also may be used in addition or in place of the hardware depicted. The depicted example is not meant to imply architectural limitations with respect to the present invention.

The data processing system depicted in FIG. 1A may be, for example, an IBM RISC/System 6000 system, a product of International Business Machines Corporation in Armonk, N.Y., running the Advanced Interactive Executive (AIX) operating system.

Figure 1B:
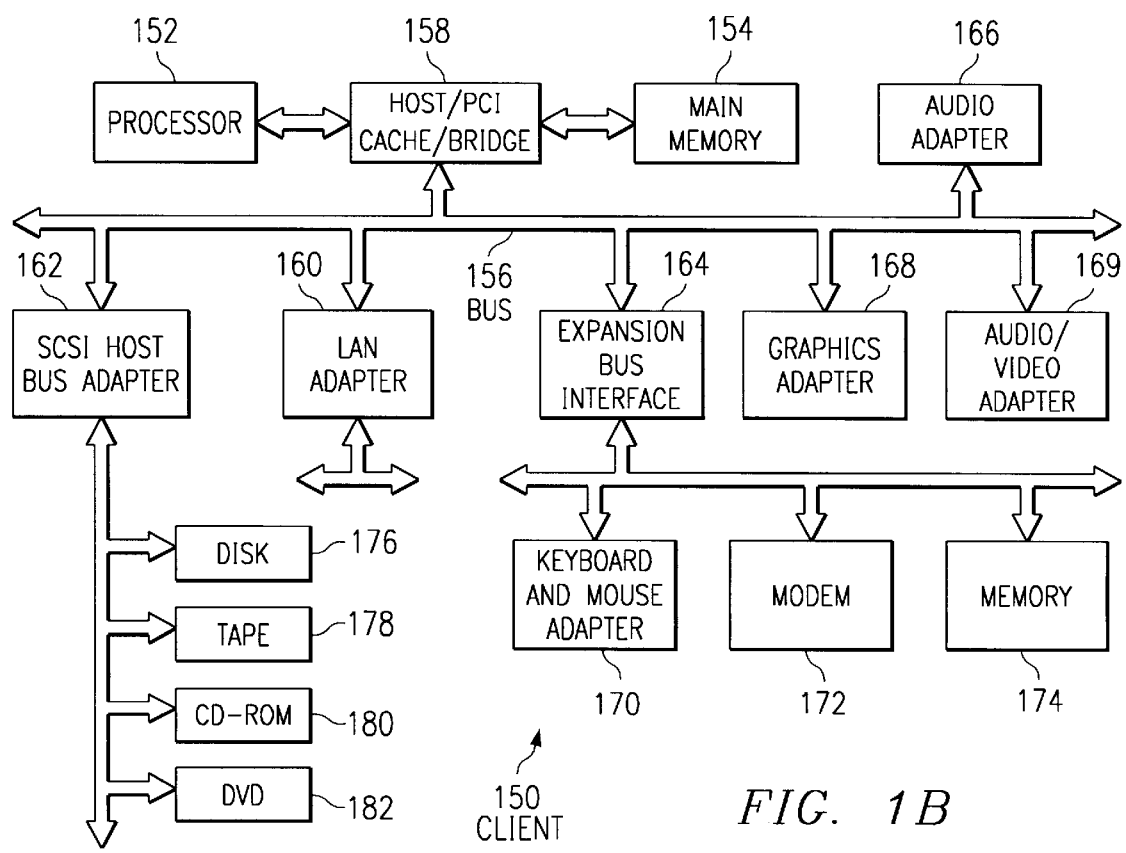
FIG. 1B is a block diagram of a data processing system in which the present invention may be implemented is illustrated.

With reference now to FIG. 1B, a block diagram of a data processing system in which the present invention may be implemented is illustrated. Data processing system 150 is an example of a client computer. Data processing system 150 employs a peripheral component interconnect (PCI) local bus architecture. Although the depicted example employs a PCI bus, other bus architectures such as Micro Channel and ISA may be used. Processor 152 and main memory 154 are connected to PCI local bus 156 through PCI Bridge 158. PCI Bridge 158 also may include an integrated memory controller and cache memory for processor 152. Additional connections to PCI local bus 156 may be made through direct component interconnection or through add-in boards. In the depicted example, local area network (LAN) adapter 160, SCSI host bus adapter 162, and expansion bus interface 164 are connected to PCI local bus 156 by direct component connection. In contrast, audio adapter 166, graphics adapter 168, and audio/video adapter (A/V) 169 are connected to PCI local bus 166 by add-in boards inserted into expansion slots. Expansion bus interface 164 provides a connection for a keyboard and mouse adapter 170, modem 172, and additional memory 174. SCSI host bus adapter 162 provides a connection for hard disk drive 176, tape drive 178, CD-ROM 180, and DVD drive 182 in the depicted example. Typical PCI local bus implementations will support three or four PCI expansion slots or add-in connectors.

An operating system runs on processor 152 and is used to coordinate and provide control of various components within data processing system 150 in FIG. 1B. The operating system may be a commercially available operating system such as JavaOS for Business™ or OS/2™, which are available from International Business Machines Corporation™. The JavaOS operating system is loaded from a server on a network to a network client and supports Java programs and applets. A couple of characteristics of the JavaOS operating system that are favorable for performing traces with stack unwinds, as described below, are that it does not support paging or virtual memory. An object-oriented programming system such as Java may run in conjunction with the operating system and may provide calls to the operating system from Java programs or applications executing on data processing system 150. Instructions for the operating system, the object-oriented operating system, and applications or programs are located on storage devices, such as hard disk drive 176 and may be loaded into main memory 154 for execution by processor 152. Hard disk drives are often absent and memory is constrained when data processing system 150 is used as a network client.

Those of ordinary skill in the art will appreciate that the hardware in FIG. 1B may vary depending on the implementation. For example, other peripheral devices, such as optical disk drives and the like may be used in addition to or in place of the hardware depicted in FIG. 1B. The depicted example is not meant to imply architectural limitations with respect to the present invention. For example, the processes of the present invention may be applied to a multiprocessor data processing system.

Figure 2:
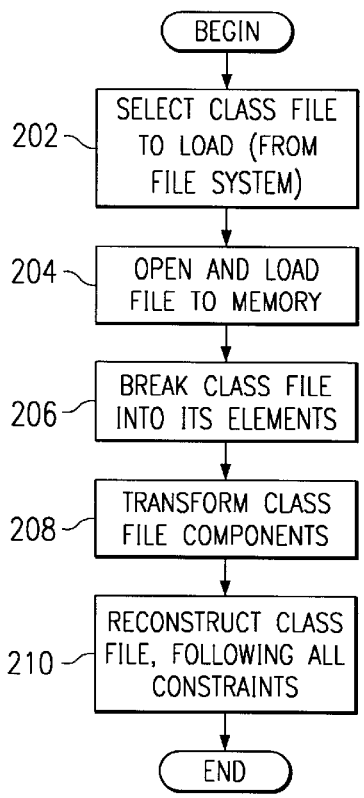
FIG. 2 is a flowchart depicting a method for modifying a class file.

Referring now to FIG. 2, a method for modifying a class file will now be described. The present invention will be described with reference to modifying a Java class file. The system and method of the present invention may be implemented in any Jvm environment (e.g., Microsoft SDK™, Sun JDK™, Sun JavaOS JVM™, or Netscape JRE™) or on any type of class file where an intermediate code abstraction (e.g., bytecode) is used. Still referring to FIG. 2, a user first selects a class file to load from a file system (step 202). The selected class file is opened and loaded into memory (step 204). The next step is to break the class file into its many parts, or elements (step 206). Because the Java class file specification is published by Sun Microsystems, Inc., it is possible to parse the class file into its constituent parts. This is typically accomplished with a class file reader. The design and implementation of a class file reader is not discussed here. Given the published class file specification, a skilled programmer could develop and implement a class file reader to break a class file into its elements.

Once the class file has been deconstructed, it can then be transformed, or modified (step 208). The modifications may include any combination of adding, deleting, or modifying code and linkage information. For example, one or more code segments, each consisting of one or more lines of code, may be added at various points throughout the class file. In the preferred embodiment, these lines of code are added to instrument the Java class file for performance reasons. However, a class file may be modified for many reason, including, but not limited to debugging, functional modifications, or benchmarking. After modification, the class file is then reconstructed (step 210). At this point, the class file, or methods within the class file, can be executed as desired by the user. Note that every method within the class file may be instrumented or only some of the methods may be instrumented. If only some of the methods are to be instrumented, it is possible to partially deconstruct the class file and instrument only the desired methods.

Java class files are often downloaded from a network, such as the Internet. The method of the present invention may be practiced on any Java class file, regardless of how the class file is obtained. If the class file is obtained from a network, such as the Internet, it is typically loaded immediately into the Jvm and executed. Such Java class files are not usually saved on the user's hard disk or in a file system. In some cases (e.g., embedded systems), there may not be a hard disk or local file system available. Class files downloaded from a network are typically loaded directly into memory by the Jvm ClassLoader. Therefore, it is necessary to intercept the class file at the loader and transform its memory image directly. This is accomplished by modifying a web browser so that it dynamically modifies class files coming from the network, as described below with reference to FIG. 3. In the described embodiment, the web browser is also a Java file, and thus the same method used to modify the web browser is used to modify downloaded Java class file. Also note that the method of the present invention works even with Java files containing a security signature, as the method of the present invention is used after the security signature verification.

The method of the present invention may be used to modify the web browser. For example, a Java enabled web browser includes Java Runtime class files, which are used to run Java applets coming across the network. The Java Runtime is modified, using the method of the present invention so that it provides functionality to modify all class files that the Runtime loads across the network for subsequent execution. In other words, the method of the present invention is invoked twice—first, to modify the web browser, and second to cause the web browser to modify a downloaded class file.

Figure 3:
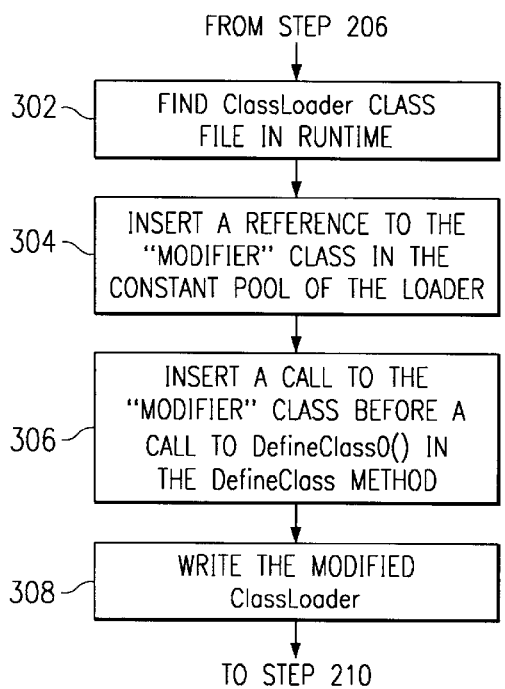
FIG. 3 is a flowchart depicting a method for modifying a network browser, or web browser.

Referring now to FIG. 3, a method for modifying a network browser, or web browser, is illustrated. Note that the web browser class files are typically stored in the file system. The first step then is to locate the ClassLoader file, which is part of the Runtime class files (step 302). A reference to the modifier class is inserted in the constant pool section of the ClassLoader (step 304). Next, a call to the modifier class is inserted into the ClassLoader instance at a point where it has received the class file and is about to give it to the VM to be instantiated (step 306). The modifications to the received class are carried out in a call to the "MODIFIER class." Finally, the modified ClassLoader is saved (step 308). The user may then proceed to select class files to download and modify from a network, such as the Internet.

Figure 4:
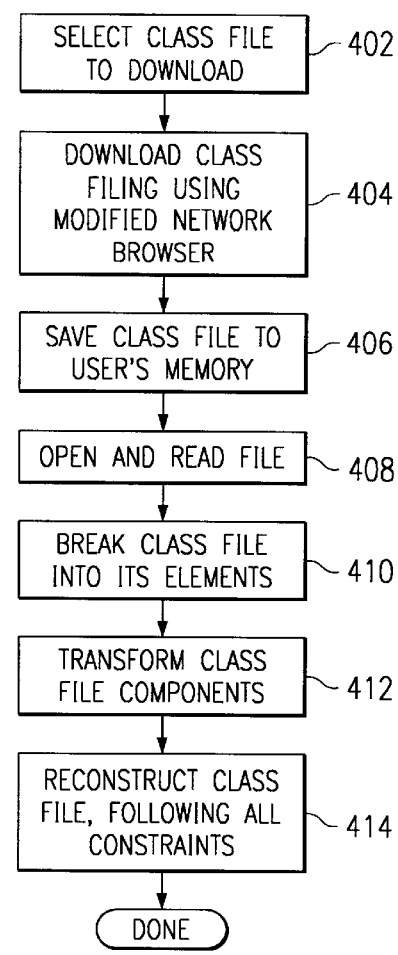
FIG. 4 is a flowchart depicting a method for downloading and modifying class files from a network.

Referring now to FIG. 4, a method for downloading and modifying class files from a network will now be described. As shown in FIG. 4, a user selects a class file to download (step 402). The class file is downloaded using a web browser which has been modified according to the method described above with reference to FIG. 3 (step 404). The class file is then saved to a memory area (step 406). The remaining steps are as discussed in FIG. 2. The class file is opened and loaded (step 408), broken into elements (step 410), transformed (step 412), and then reconstructed (step 414).

Figure 5:
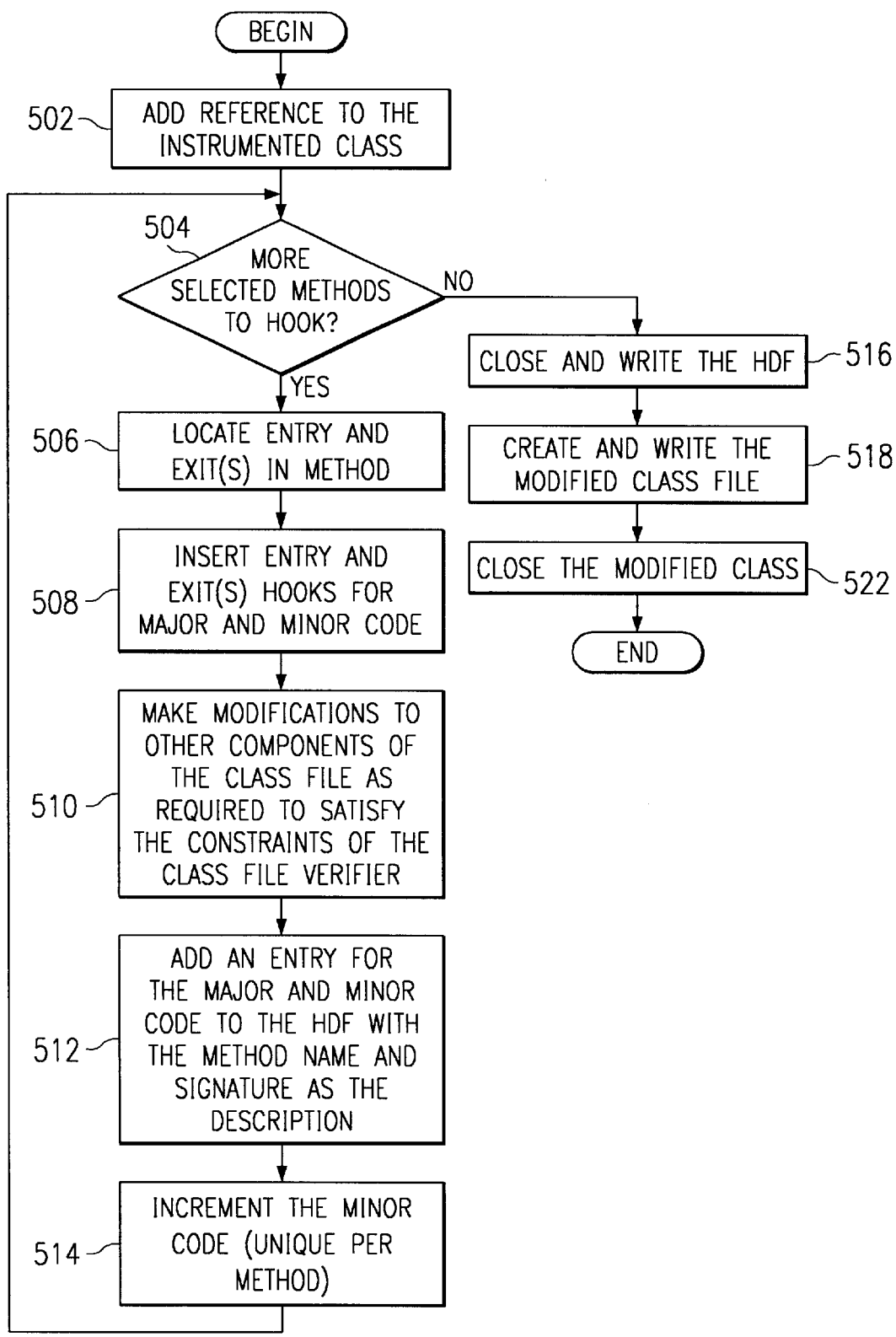
FIG. 5 is a flowchart depicting additional details regarding modifying class files from a network.

Referring now to FIG. 5, additional details regarding the modifying class files. FIG. 5 illustrates one embodiment of modifying class flies, i.e. adding code for the purpose of instrumentation. Code may be added to, deleted from, or modified in the Java class file for many reasons, including instrumentation, benchmarking, performance tuning, modifying functionality, applying functional or performances patches, etc. While the invention will be described with reference to adding instrumentation code for the purpose of performance measurement and analysis, this is not meant to limit the present invention.

FIG. 5 illustrates the steps of transforming the class file components and then reconstructing the class file, specifically for the purpose of adding performance instrumentation code at the entry and exit of every method contained in the class file. This is, of course, only one embodiment of the present invention, and is discussed in detail for illustrative purposes. The unique system and method of the present invention may be used for many purposes, as discussed above.

Every method in a class file has a unique method signature. The method signature is not the same as the security signature discussed above. A method signature is a string containing the method name and an encoding of the number and types of formal parameters to the method. The Java language specification describes this encoding in such a way as to guarantee uniqueness for every method in a class. For example, a method referred to as "method_X" which takes a single integer as a formal parameter would have the method signature "method_X(I). A class file can not have two methods with the same method signature. If code is written such that a class file would have two methods with the same method signature, a compiler error occurs. The performance instrumentation takes the form of a trace hook that is written to a trace facility every time the instrumented method is either entered or exited. Each hook is uniquely identified with a major code and a minor code.

Referring now to FIG. 5, assume that a class file has been opened, and a hook definition file (HDF) has also been opened for creation. The HDF will be used to record information about the mapping between specific trace hook major and minor codes and the methods into which they are being inserted. For example, consider class "TEST" having two methods, <method_X>and <method_Y>. As each method is instrumented with an entry and exit hook, entries will be made in the HDF file that identify the major and minor codes for those hooks, along with the class name and method signature. The entries, for example, may look as follows:

| major/minor | class/method |
|---|---|
| 22/01 | TEST.method_X(I) |
| 22/81 | TEST.method_X_exit |
| 22/02 | TEST.method_Y( ) |
| 22/82 | TEST.method_Y_exit |

In the above excerpt from a possible HDF file, major code 22 and minor code 01 are associated with the trace hook placed at the entry of method_X in class TEST. The method signature (e.g., "(I)") is recorded to allow for clear discrimination between overloaded methods (i.e. class constructors are frequently overloaded, and the only way to discriminate between one constructor and the other is to examine the method signature).

Note that an HDF file is not a requirement but serves as an optimization in implementing the trace hooks. The resulting trace stream consists of sequences of major/minor codes (with time stamps). A postprocessing phase takes the HDF file and merges it with a trace stream, resulting in a trace stream that identifies methods/classes by name. The following is an example of a trace stream that may be generated by merging trace data with the above HDF file:

| major | minor | timestamp | description |
|---|---|---|---|
| 12 | 1 | 15:985860940 | Dispatch thread: e18507a0 |
| 22 | 1 | 15:985633507 | ENTRY: TEST.method_X (I) |
| 12 | 1 | 15:985845671 | Dispatch thread: e17d5bb0 |
| 12 | 1 | 15:985860940 | Dispatch thread: e1807a0 |
| 22 | 81 | 15:985833507 | EXIT: TEST.method_X_exit |
| 22 | 2 | 15:985833507 | ENTRY: TEST.method_Y ( ) |
| 22 | 82 | 15:985833507 | EXIT: TEST.method Y exit |

As shown in FIG. 5, a reference to the instrumentation class is added into the constant pool section of the class file (step 502). While there are more methods to hook (step 504), the following steps are performed. For each method, the entry point and one or more exit points are located (step 506). An entry hook and exit hooks are inserted for the major and minor codes (step 508). Selective instrumentation is possible if only some of the methods are to be instrumented. In the described embodiment, an inclusion/exclusion list is used to specify which methods are to be instrumented. However, any number of procedures may be used to determine whether a particular method is to be instrumented or to specify which methods are to be instrumented.

On entry into a method, the following invocation is inserted:

instrumentation Library.log(major_code,minor_code);

Just prior to returning from the method, the following invocation is inserted:

instrumentation Library.log(major_code,minor_code);

There are often several exit points for a single method, and each exit point must be so instrumented. At postprocessing time, the major codes and minor codes are resolved with specific method and class names from the HDF file. This allows collection to proceed without the overhead of recording large amounts of double-byte string data.

Bytecode modification requires the insertion of Java bytecode instructions that affect the method invocations noted above. Insertion requires the identification of method bodies, interpretation of existing bytecodes, and location of entry and exit points. It is critical that the modifications be consistent with the criteria employed by the class file verifier. The class file verifier ensures that the bytecode, and the rest of the class file, is valid and can be executed by the Jvm. Thus, the next step is to modify the other components of the class file to ensure that they satisfy the constraints of the class file verifier (step 510). Further details regarding step 514 are described below with reference to FIG. 8.

Next, an entry is added to the HDF (step 512). The entry includes the major and minor codes, and method signature as the description. The minor code is then incremented to ensure that it is unique for each method (step 514).

When there are no more methods to hook, the HDF is closed and written to the file system (step 516). The modified class file is then created (step 518) and closed (step 522). The modified, or transformed, class file is then ready to be executed.

In the above described process for adding performance instrumentation code at the entry and exit of every method contained in a class file, a postprocessor attributes the consumption of resources to the method in control at the time the resources were consumed. However, when the flow of control includes exception and finalization processing the postprocessing results are subject to incorrect results. Exception code within the bytecode of a method transfers control away from the method in which an error has occurred, similar to a method exit, conversely, catch code within the bytecode of a method receives control from the method having the exception. The catching method may also provide finalization processing which closes all open files and exits out of the class. However, without instrumenting the exception path between methods, a method entry would be written to a record for the method generating the exception without a corresponding record for the exit from the method because control was passed away from the method without writing a method exit record. Similarly, a method exit record would be written for the method catching the exception without a corresponding method entry because control was received due to the catch without writing an method entry record. All resources consumed by both methods would be attributed to the method throwing the exception because no record exists indicating a transfer of control from the method throwing the exception to the method receiving the exception. In the case where the exception results in finalization processing, all resources devoted to exiting out of the class will be attributed to the method throwing the exception. Therefore, in an effort to reduce postprocessing errors, class files must also be instrumented for exceptions and finalization processing. Exceptions and finalization are handled similarly in accordance with a preferred embodiment of the present invention and therefore they will be discussed together.

Figure 6:
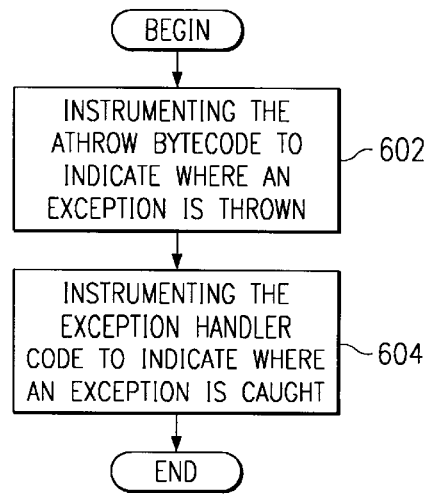
FIG. 6 is a flowchart illustrating a high level method for instrumenting an exception in accordance with a preferred embodiment of the present invention.

FIG. 6 is a flowchart illustrating a high level method for instrumenting an exception in accordance with a preferred embodiment of the present invention. The process begins by instrumenting a method at the "athrow," or equivalent code, to indicate where an exception is thrown (step 602). Next, the point in the catching method must also be instrumented, where the exception is caught, thus the method is instrumented at the exception handler code (step 604). Importantly, the catching method may continue executing, in an attempt to "execute around" the exception, or may instead provide finalization processing for exiting out of the preloaded class. The high level process for instrumenting path flow for an exception is complete, however, it should be understood that instrumenting for finalization process is identical to the above-described process.

Figure 7:
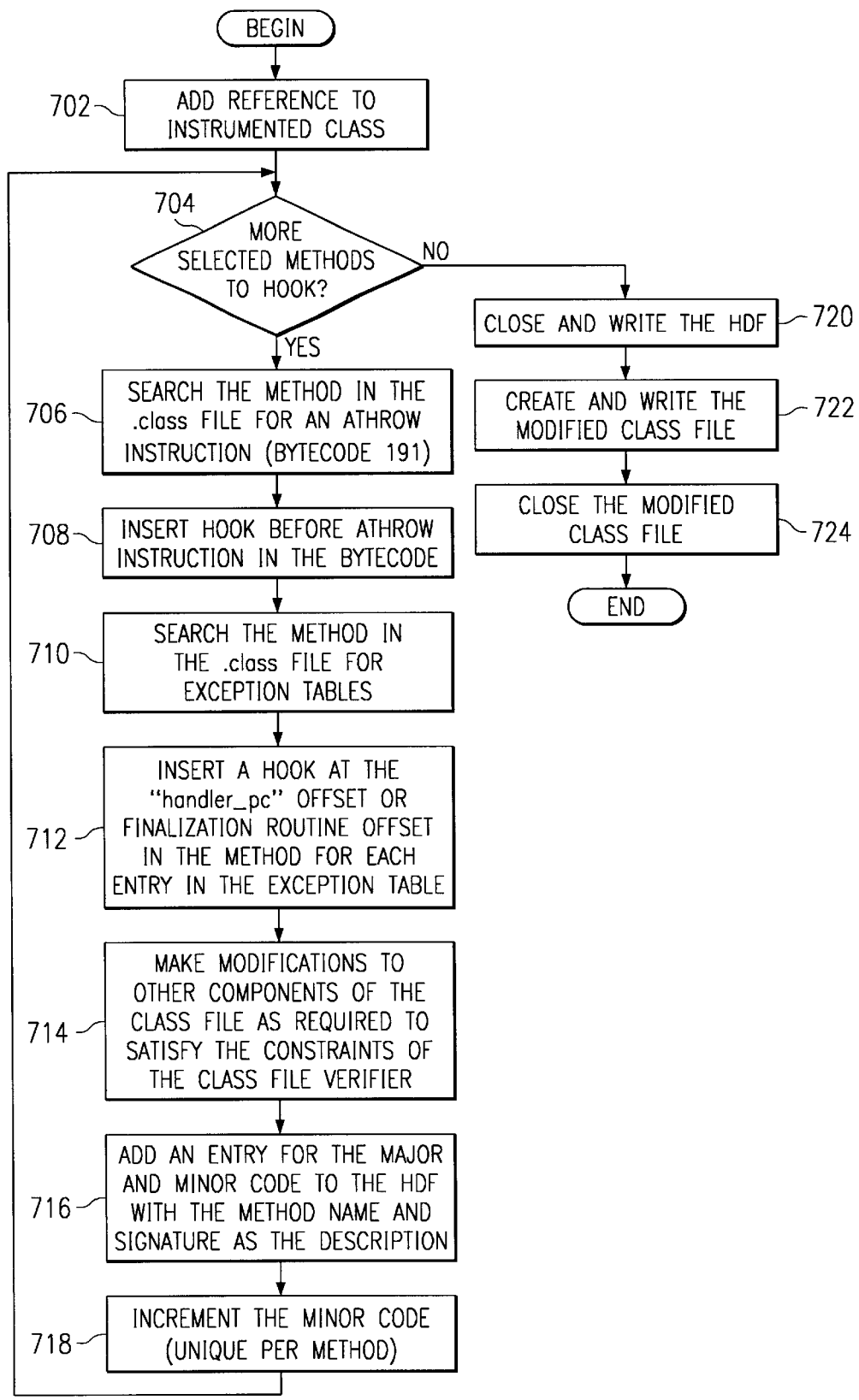
FIG. 7 is a flowchart depicting a process for injecting hooks in a class file for handling exception and finalization processing.

With respect to FIG. 7, a flowchart depicts a process for injecting hooks in a class file for handling exception and finalization processing. The process described below is similar to the process for instrumenting a class at an entry and exit of a method, described above, therefore, only the differences in the processes will be discussed in detail. Initially, a reference to the instrumentation class is added into the constant pool section of the class file (step 702). A check is then made to determine if there are more selected methods that may have exceptions to be hooked (step 704). Methods which will throw an exception have an "athrow" instruction at the point in the bytecode where the exception is thrown (and control is passed away from that method). Therefore, each method in a selected class file is searched for an athrow instruction (step 706). An exception hook (or finalization hook) is inserted in the method's bytecode before the occurrence of the athrow instruction (step 708). The hook has an encoded ID for the method from which it is thrown. The encoded ID can be decoded as at postprocessing time to a method name, using the HDF file.

Next, each method is searched for exception tables (step 710). Once found, each entry in the exception table is read. Entries in the exception may define two different types of processing code, exception processing and finalization processing. A hook is added at the "handler_pc" offset in the method for each entry in the exception table which defines exception processing code, while conversely, a hook is added at the finalization routine offset in the method for each entry in the table which defines finalization processing (step 712). A handler_pc offset is the point in the method where an exception handler resides for an entry in the exception table. The exception handler in a method is the catch clause for the exception identified by the entry in the exception table. The method which includes the catch clause will receive control from the method throwing the exception. Similarly, a finalization routine offset is the point in the method where finalization processing code resides for an entry in the exception table. The finalization routine is the catch clause for the exception which is identified by the entry in the exception table. Each instrumented method must have its catch clauses hooked in case the method is executed via an exception catch. Each hook has an encoded ID for the method where the exception is caught, whether the method performs exception processing or finalization processing. Again, the encoded ID can be decoded as at postprocessing time to a method name, using the HDF file.

Selective instrumentation of exceptions is not possible without considering if the method itself has been instrumented because the exception control path will not be recorded. Each exception in an instrumented method and all catch clauses in an instrumented method must be instrumented in order to avoid un-matching method entries and exits.

Modifications to the athrow and the exception handled bytecodes, for instrumenting an exception or finalization path, are identical to modifications to a method's bytecode for entries and exits. To indicated where an exception is thrown, the following invocation is inserted:

instrumentation Library.log(major_code,minor_code);

To indicated where the exception is being caught, the following invocation is inserted:

instrumentation Library.log(major_code,minor_code);

There may be several entries in an exception table and all catch points represented by entries in the method's exception table must be instrumented in order to assure that all exception paths to the method are recorded. At postprocessing time, the major codes and minor codes are resolved with specific method and class names from the HDF file.

Modifications of the bytecode must be consistent with the criteria employed by the class file verifier. The class file verifier ensures that the bytecode, and the rest of the class file, is valid and can be executed by the Jvm. Thus, other components of the class file must be modified to ensure that they satisfy the constraints of the class file verifier (step 714). Further details regarding step 714 are described below with reference to FIG. 8.

Next, an entry is added to the HDF file (step 716). The entry includes the major and minor codes, and method signature as the description. The minor code is then incremented to ensure that it is unique for each method (step 718).

When there are no more methods to hook, the HDF file is closed and written to the file system (step 720). The modified class file is then created (step 722) and closed (step 724). The modified, or transformed, class file is then ready to be executed. Step 510, in FIG. 5 (step 714 in FIG. 7) is depicted in greater detail in FIG. 8. As code is inserted in the existing stream for each method, verification is ensured by:

1. Creating constant pool entries for the instrumentation class and methods (steps 502 and 512 in FIG. 5).
2. Ensuring code that is moved is correctly relocated, and that all related references are adjusted for the relocation (step 510).

Figure 8:
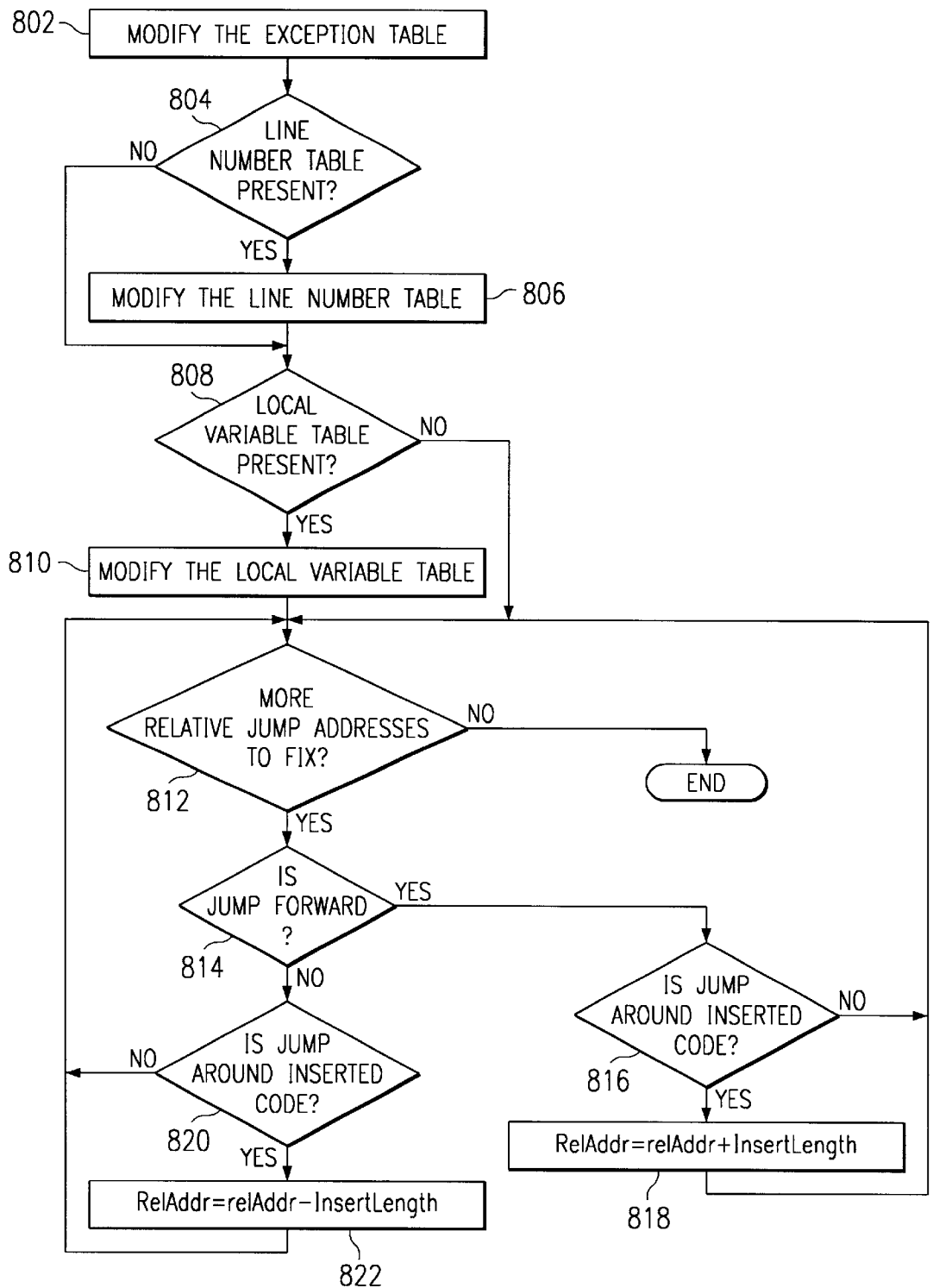
FIG. 8 is a flowchart depicting the steps necessary to ensure that code which is moved due to either insertions or deletions is correctly relocated and related references are adjusted.

As shown in FIG. 8, several steps must be taken to ensure that code which is moved due to either insertions or deletions is correctly relocated and related references are adjusted. First, the exception table is modified (step 802). In Java programs or applications, an exception handler may be set up to handle specific exceptions that occur at specified line numbers. Adding or deleting code may change the line numbers associated with a particular exception handler. Therefore, the exception table may need to be adjusted so that the correct exception handler is called for exceptions which occur at certain line numbers.

If a line number table is present (step 804), it is modified (step 806). Similarly, if a local variable table is present (step 808), it is modified (step 810). For each relative jump address (step 812), it is first determined if the jump is a jump forward (step 814). If so, the next step is to determine if it is a jump around inserted code (step 816). If it is, the relative address is incremented by the insert length (step 818). If the jump is a jump backward (answer to step 814 is "no"), and the jump is around inserted code (step 820), then the relative address is decremented by the insert length (step 822).

In the described embodiment, the instrumentation class is a separate and distinct Java class. Of course, different types of classes are used for different purposes. If the purpose of the code modifications is to change the functionality of the code, rather than to instrument the code, a different type of class may be used. There is also no requirement that the instrumentation class be a Java class. The instrumentation class could be a native class, and one skilled in the art would appreciate that appropriate linkages would have to be established in order to make calls to the native class.

In the described embodiment, the instrumentation class exports several methods, including:

1. log: Used to log entry/exit, exceptions and finalizations (or any other control point). Note that serialization is provided to ensure that more than one instrumented class can log simultaneously. Also note that logging will alternately be to a hardware or software trace capability, and logging may exploit native machine methods (i.e. methods that are written in assembly code, rather than Java) that make use of efficient machine timestamp acquisition.
2. Init: Initialized logging capability (e.g., allocates a buffer).
3. Dump: Produces an output file of logged data.

The following example depicts the source code of a Java class file being instrumented, a disassembly of the class file before it is hooked, and a disassembly of the same class file after it is hooked. The example depicts how code (i.e. methods) in the class file can be modified. In this particular case, instrumentation hooks are inserted at method entry and exit(s) for performance measurement. Notice how the major and minor code for the hook is pushed on the stack with the short integer push ("sipush") instructions before a call (invokestatic instruction) is made to the "log" method of the instrumentation class. Three Jvm instructions are inserted for each entry or exit hook. Also note that in some cases, dummy instructions (e.g., iconst_0 and pop2) may be added to keep the inserted code size in multiples of four. This is done because some specific bytecode instructions require 4-byte alignment. In the example below, none of the instructions require 4-byte alignment; however, the dummy instructions are added as part of the described embodiment.

```
/* A Java class file named hello.java */
class hello
{
    public static void main (String args[ ])
    {
        System.out.println ("Hello, how are you today?");
    }
}
/* A disassembly of hello.class before it is hooked */
compiled from hello.java
synchronized class hello extends java.lang.Object
    /* ACC_SUPER bit set */
{
    public static void main (java.lang.String[ ]);
    hello ( );
```

-continued

```
}
Method void main (java.lang.String[ ]);
    0 getstatic #7 <Field java.io.PrintStram out>
    3 ldc #1 <String "Hello, how are you today? ">
    5 invokevirtual #8
        <Method void println (java.lang.String)>
    8 return
Method hello ( )
    0 aload_0
    1 invokespecial #6 <Method java.lang.Object( )>
    4 return
/* A disassembly of hello.class after it is hooked */
Compiled from hello.java
synchronized class hello extends java.lang.Object
        /* ACC_SUPER bit set */
{
    public static void main (java.lang.String[ ]);
    hello ( );
}
Method void main (java.lang.STring[ ])
    0 sipush 2560
    3 sipush 1
    6 invokestatic #37 <Method void log (int,int)>
    9 iconst_0
    10 iconst_0
    11 pop2
    12 getStatic #7 <Field java.io.PrintStream out>
    15 ldc #1 <String "Hello, how are you today?">
    17 invokevirtual #8
        <Method void println (java.lang.String)>
    20 sipush 2688
    23 sipush 1
    26 invokestatic #37 <Method void log (int,int)>
    29 iconst_0
    30 iconst_0
    31 pop2
    32 return
Method hello ( )
    0 sipush 2560
    3 sipush 2
    6 invokestatic #37 <Method void log (int,int)>
    9 iconst_0
    10 iconst_0
    11 pop2
    12 aload_0
    13 invokespecial #6 <Method java.lang.Object ( )>
    16 sipush 2688
    19 sipush 2
    22 invokestatic #37 <Method void log (int,int)>
    25 iconst_0
    26 iconst_0
    27 pop2
    28 return
```

Consider the following example for instrumenting exceptions in a method: The program test.java has 2 functions, "main" which calls "testfunc." Note that testfunc throws an exception that is caught in an exception table in "main." Instrumentation is inserted before the athrow bytecode in testfunc and also at the beginning of the catch code in main. The java code for the example is:

```
lass class test {
1 public static void main (String[ ] args) {
        try {
            System.out.println ("In main");
            testfunc (1);
            System.out.println ("Back in main");
        } catch (Exception e) {
            System.out.println ("exception caught");
        }
    }
    public static void testfunc (int i) throws Exception {
        if (i==1) {
```

```
            throw (new Exception( ));
        } else {
            System.out.println ("Exception not thrown");
        }
    }
}
```

The unmodified bytecodes for "main" and "testfunc" are:

```
Method void main (java.lang.String[ ])
    0 getstatic #11 <Field java.io.PrintStream out>
    3 ldc #3 <String "In main">
    5 invokevirtual #12 <Method void println (java.lang.String)>
    8 iconst_1
    9 invokestatic #14 <Method void testfunc (int)>
    12 getstatic #11 <Field java.io.PrintStream out>
    15 ldc #1 <String "Back in main">
    17 invokevirtual #12 <Method void println (java.lang.String)>
    20 goto 32
    23 pop
    24 getstatic #11 <Fieldjava.io.PrintStream out>
    27 ldc #4 <String "exception caught">
    29 invokevirtual #12 <Method void println(java.lang.String)>
    32 return
Exception table:
from to target type
    0    20   23    <Class java.lang.Exception>
Method void testfunc (int)
    0 iload_0
    1 iconst_1
    2 if_icmpne 13
    5 new #7 <Class java.lang.Exception>
    8 dup
    9 invokespecial #10 <Method java.lang.Exception( )>
    12 athrow
    13 getstatic #11 <Field java.io.PrintStream out>
    16 ldc #2 <String "Exception not thrown">
    18 invokevirtual #12 #Method void println(java.lang.String)>
    21 return
```

The modified bytecodes of "main" and "testfunc" after the insertion of the exception instrumentation is:

```
Method void main (java.lang.String[ ])
    0 getstatic #11 <Field java.io.PrintStream out>
    3 ldc #3 <String "In main">
    5 invokevirtual #12 <Method void println (java.lang.String)>
    8 iconst_1
    9 invokestatic #14 <Method void testfunc (int)>
    12 getstatic #11 <Field java.io.PrintStream out>
    15 ldc #1 <String "Back in main">
    17 invokevirtual #12 <Method void println (java.lang.String)>
    20 goto 44
/* catch clause instrumentation begin */
    23 sipush 2560
    26 sipush 2
    29 invokestatic #99 <Method void log (int,int)>
    32 iconst_0
    33 iconst_0
    34 pop2
/* catch clause instrumentation end */
    35 pop
    37 getstatic #11 <Field java.io.PrintStream out>
    39 ldc #4 <String "exception caught">
    41 invokevirtual #12 <Method void println (java.lang.String)>
    44 return
Exception table:
from to target type
    0    20   23    <Class java lang.Exception>
Method void testfunc (int)
    0 iload_0
    1 iconst_1
    2 if_icmpne 13
    5 new #7 <Class java.lang.Exception>
```

-continued

```
 8 dup
 9 invokespecial #10 <Method java.lang.Exception ( )>
/* athrow instrumentation begin */
12 sipush 2560
15 sipush 1
18 invokestatic #99 <Method void log (int,int)>
21 iconst_0
22 iconst_0
23 pop2
/* athrow instrumentation end */
24 athrow
25 getstatic #11 <Field java.io.PrintStream out>
28 ldc #2 <String "Exception not thrown">
30 invokevirtual #12 <Method void println (java.lang.String)>
33 return
```

Figure 9:
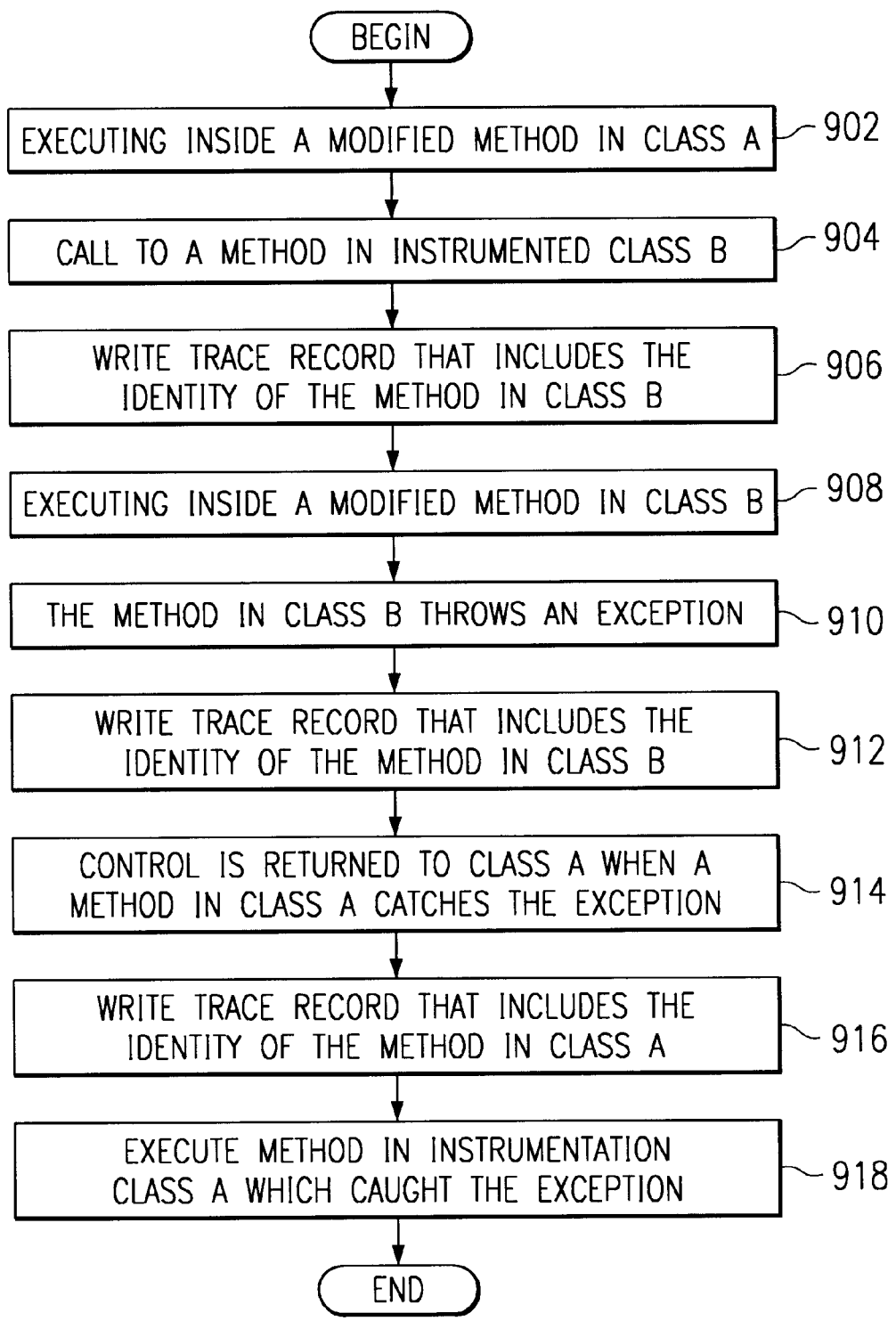
FIG. 9 is a flowchart depicting a process for handling an exception thrown from a modified method in a class to a method in an instrumented class.

Referring now to FIG. 9, is a flowchart depicting a process for handling an exception thrown from a modified method in a class to a method in another instrumented class in accordance with a preferred embodiment of the present invention. Initially, the code is executing inside a modified method in class A (step 902). The reader will recall that code was injected in class A, such as the instrumentation hooks for handling exception and finalization processing, as well as in class B, as was described in the foregoing example. Those skilled in the art will appreciate that other types of code performing other functions could be called by the injected code according to the present invention. Class instrumentation is performed prior to any methods being called or exception being thrown in order to allow for performance measuring. Initially, injected code in the executing method in class A calls a method in class B (step 904). Thus, control is passed from class A to class B via the call and a record is written describing the flow path (step 906). This record may also include the name of the entering method and class. The current call stack now includes at least the method in class A and the method in class B. The called method in class B then executes, or attempt to execute (step 908). At some point an error occurs in the execution of the method in class B and the method currently executing in class B throws an exception (step 910). At this point the injected code in the method writes an exception hook to a record which identifies the method throwing the exception and also describes the event as an exception (step 912). The exception is caught by a method, for example a method in the calling class, class A, which is preferably a Java class (step 914). The exception could, instead, be caught by any method in the call stack including the currently executing method. In the present example, control is then passed back to class A from class B via an exception being thrown. The catching method either executes exception or finalization processing code. Here again, the instrumentation writes record describing the catch and identifying the catching method and class (step 916). The catching method is executed in class A, e.g., an instrumented method (step 918). The process for handling an exception thrown from a modified method in a class to a method in another instrumented class is then complete.

Consider the following trace where an exception is thrown in testfun ( ) and caught in the function main ( ), from the example test.java given earlier. Note that in the trace here, major code 23 is being used for normal Method Entry/Exit instrumentation and 24 is being used for the exception throw and catch instrumentation.

| major | minor | timestamp | description |
|---|---|---|---|
| 12 | 1 | 15:985860940 | Dispatch thread: e18507a0 |
| 23 | 1 | 15:985861001 | ENTRY: test.main Ljava.lang.String [ ]) I |
| 12 | 1 | 15:985861120 | Dispatch thread: e17d5bb0 |
| 12 | 1 | 15:985900110 | Dispatch thread: e1807a0 |
| 23 | 2 | 15:985901050 | ENTRY: test.testfunc (I) V |
| 24 | 82 | 15:985903804 | Exception thrown Exiting test.testfunc (I) V |
| . | | | |
| . | | | |
| . | | | |
| 24 | 1 | 15:985905500 | Exception Caught test.main (Ljava.lang.String [ ]) I |
| 23 | 82 | 15:985907050 | EXIT: test .main (Ljava.lang.String[ ]) I |

Please note that when exception thrown hook 24/82 is encountered, it is taken as an exit from the method indicated by it ("test.testfunc(I)V") for accounting purposes. The accounting is continued for the method catching the exception, ie the 24/1 hook. Also note that this is a trivial example, but any number of functions could have been on the call stack between "testfunc( )" and "main( )", and for accounting purposes an exit would be implied on all functions on the call stack, between the function throwing the exception and the one catching it.

Although the invention has been described with a certain degree of particularity, it should be recognized that elements thereof may be altered by persons skilled in the art without departing from the spirit and scope of the invention. One of the preferred implementations of the invention is as sets of instructions resident in the main memory 154 of one or more computer systems configured generally as described in FIG. 1A. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. A method for modifying a class file for path flow mapping comprising:
   finding exception code in a routine;
   inserting an exception hook adjacent to the exception code, wherein the exception hook contains a routine identifier for the routine;
   finding an exception table; and
   inserting a catch hook at an offset specified by an entry in the exception table corresponding to the exception code, wherein the catch hook contains a second routine identifier for a second routine and the entry in the exception table points to exception handler code in the second routine corresponding to the exception code in the routine.

2. The method for modifying a class file according to claim 1, wherein the exception hook is inserted prior to the occurrence of the exception code in the routine.

3. The method for modifying a class file according to claim 1, wherein the exception code is an "athrow" statement.

4. The method for modifying a class file according to claim 1, wherein the exception hook is identified by major and minor codes from the routine in which the exception hook is inserted.

5. The method for modifying a class file according to claim 1, further comprises:
   modifying a hook definition file with an identifier for mapping the major and minor codes of the routine to a routine name.

6. The method for modifying a class file according to claim 1, wherein the catch hook is a first catch hook and the entry in the exception table is a first entry, the method further comprises:
   inserting a second catch hook at an offset specified by a second entry in the exception table, wherein the second catch hook contains a routine identifier for a third routine.

7. The method for modifying a class file according to claim 1, wherein the catch hook is identified by major and minor codes from the routine in which the catch hook is inserted.

8. The method for modifying a class file according to claim 1, further comprises:
   modifying a hook definition file with an identifier for mapping the major and minor codes of the second routine to a routine name.

9. The method for modifying a class file according to claim 1, wherein the routine is an object oriented programming method.

10. A method for modifying a class file for path flow mapping comprising:
    executing a routine in a class;
    finding exception code in the routine;
    writing an exception record, wherein the exception record includes a routine identifier for the routine;
    throwing an exception;
    catching the exception in a second routine containing exception handler code corresponding to the exception code in the routine; and
    writing a catch record, wherein the catch record includes a routine identifier for the second routine.

11. The method for modifying a class file according to claim 10, further comprises:
    creating a path flow map by postprocessing the exception record and the catch record.

12. A method for modifying a class file for path flow mapping comprising:
    finding exception code in a routine;
    inserting a hook adjacent to the exception code, wherein the hook contains a routine identifier for the routine;
    finding an exception table; and
    inserting a catch hook in a second routine at an offset specified by an entry in the exception table, wherein the catch hook contains a second routine identifier for the second routine and the entry in the exception table points to exception handler code in the second routine corresponding to the exception code in the routine.

13. The method for modifying a class file according to claim 12, wherein the second routine provides object oriented programming finalization processing.

14. A data processing system for modifying a class file for path flow mapping comprising:
    executing means for executing a routine in a class;
    finding means for finding exception code in the routine;
    writing means for writing an exception record, wherein the exception record includes a routine identifier for the routine;
    throwing means for throwing an exception;
    catching means for catching the exception in a second routine containing exception handler code corresponding to the exception code in the routine; and
    writing means for writing a catch record, wherein the catch record includes a routine identifier for the second routine.

15. The system for modifying a class file according to claim 14, further comprises:
    creating means for creating a path flow map by postprocessing the exception record and the catch record.

16. A computer program product incorporated in a computer readable memory for modifying a class file for path flow mapping comprising:
    instruction means for executing a routine in a class;
    instruction means for finding exception code in the routine;
    instruction means for writing an exception record, wherein the exception record includes a routine identifier for the routine; and
    instruction means for throwing an exception;
    instruction means for catching an exception in a second routine containing exception handler code corresponding to the exception code in the routine; and
    instruction means for writing a catch record, wherein the catch record includes a routine identifier for the second routine.

* * * * *

UNITED STATES PATENT AND TRADEMARK OFFICE
CERTIFICATE OF CORRECTION

PATENT NO.     : 6,662,359 B1
DATED          : December 9, 2003
INVENTOR(S)    : Berry et al.

It is certified that error appears in the above-identified patent and that said Letters Patent is hereby corrected as shown below:

Column 8,
Line 47, after "decoded" delete "as".

Column 9,
Line 6, after"decoded" delete "as".

Column 11,
Line 57, before "class" delete "lass".

Column 16,
Line 42, after "routine;" delete "and".

Signed and Sealed this

Seventh Day of September, 2004

JON W. DUDAS
*Director of the United States Patent and Trademark Office*